June 1, 1943. D. BENSEL 2,320,982
PROCESS FOR PRESERVING FOODS
Original Filed July 31, 1940 2 Sheets-Sheet 2
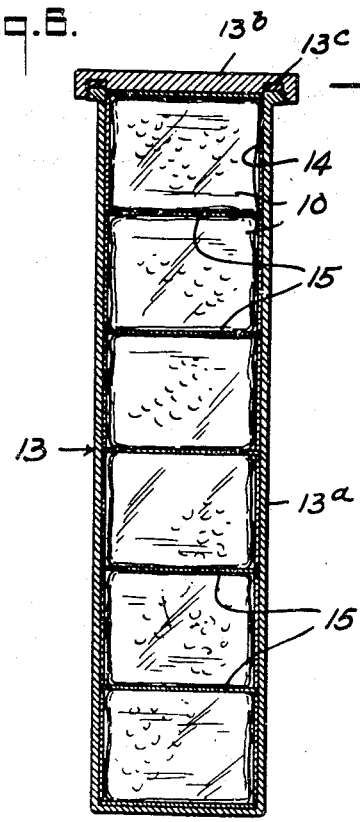
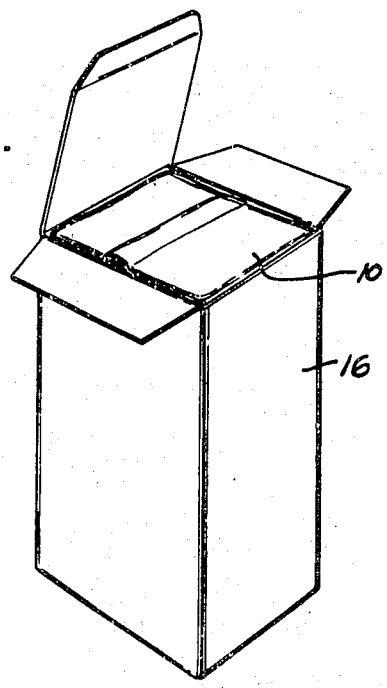
Duryea Bensel
by
Ely r Frye Patented June 1, 1943

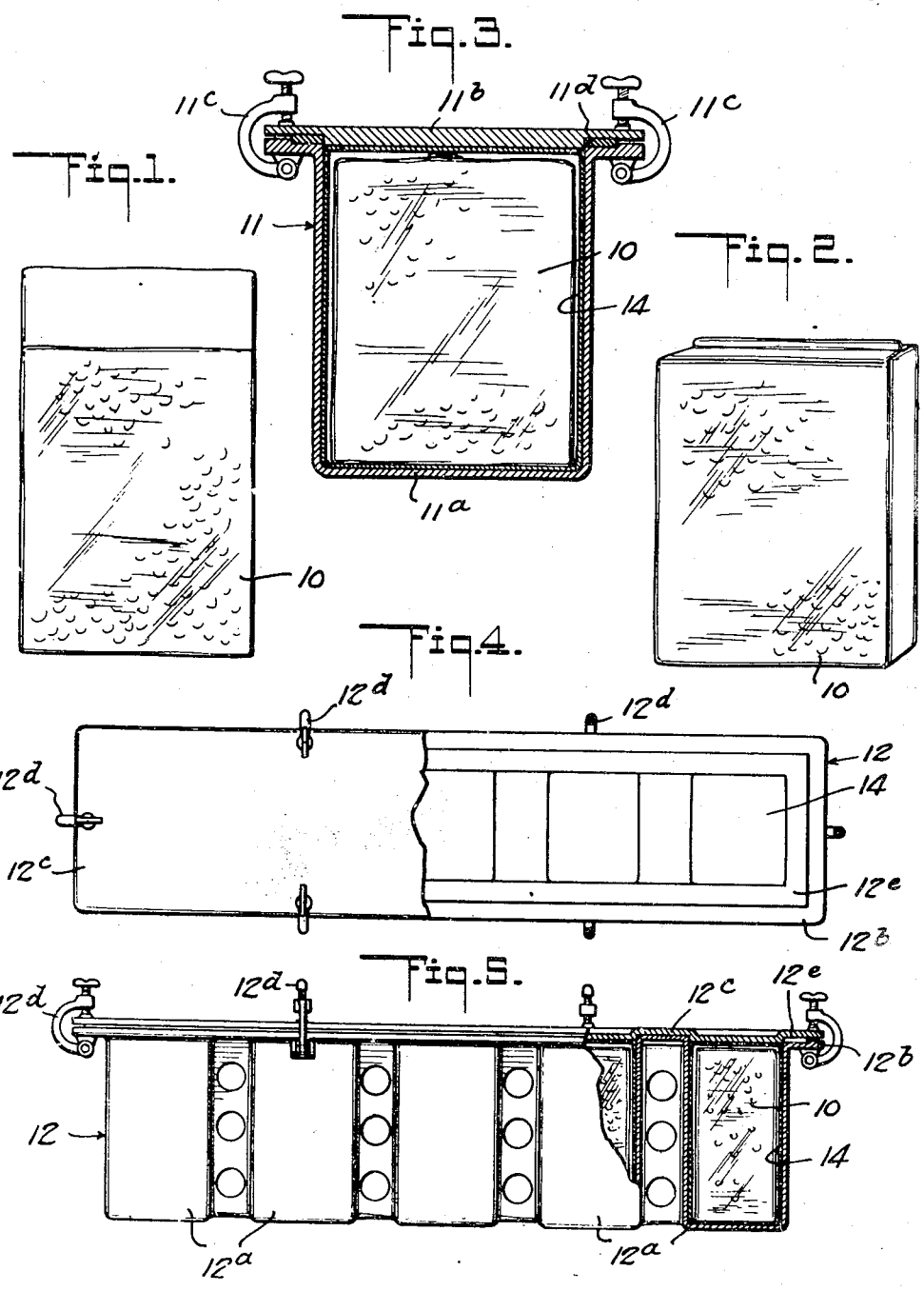

2,320,982

UNITED STATES PATENT OFFICE 2,320,982

PROCESS FOR PRESERVING FOODS

Duryea Bensel, Los Angeles, Calif., assignor to Bensel-Brice Corporation, Los Angeles, Calif., a corporation of California Original application July 31, 1940, Serial No. 348,872. Divided and this application January 9, 1941, Serial No. 373,787

5 Claims. (Cl. 99—186)

This invention relates generally to the preserving art, and, more particularly, to the preservation of fresh foods and other perishable products. This application is a divisional application of my copending application No. 348,872, filed July 31, 1940, a continuation of my application No. 270,111, filed April 26, 1939.

An object of this invention is to provide a process which utilizes an inexpensive, lightweight, durable and attractive container in which foods, such as vegetables, fruits, fish, shellfish, meats, or fowl, for example, can be preserved substantially indefinitely without deterioration. At present such foods are preserved by either cold pack, open kettle, or dry pack methods in expensive metal and glass containers.

Another object of the invention is to provide a preserving process in which an inner container directly receiving the food to be preserved is structurally incapable of retaining its form during the cooking operation, and is confined in a structurally strong outer cooking container in a manner to be effectively supported thereby against distortion, expansion, or other dimensional or physical change which would cause excessive stretching, rupture or other structural failure of the inner container.

A further object of the invention is to provide a preserving process in which the inner food container is either placed in a carrier container or surrounded by a suitable liner in the cooking container to prevent the material of the inner container from sticking to the cooking container under the action of heat applied to the latter for cooking the product.

With these and other objects in view, the invention resides in the process as set forth in the following specification, claims, and in the accompanying drawings, in which:

Figure 1 is a view in side elevation of an inner container utilized in the preserving process, and supplied with a fresh food product;

Figure 2 is a view similar to Figure 1, with the inner container sealed air-tight;

Figure 3 is a vertical sectional view illustrating a cooking container with a single inner container pressure-sealed therein;

Figure 4 is a plan view, partly broken away, of a cooking container for handling inner containers in quantity;

Figure 5 is a view in side elevation, partly in section, of the cooking container shown in Figure 4;

Figure 6 is a vertical sectional view of a modified form of a cooking container for handling inner containers in quantity;

Figure 7 is a perspective view of the inner container enclosed by a carrier container to form a complete package.

In carrying the invention into practice, the product to be preserved is first thoroughly cleaned, cut to size if necessary, and may be partially cooked in an open kettle. A suitable amount of the product is then placed in an inner container or bag 10 as shown in Figures 1 to 5, inclusive.

This inner container 10 may be constructed of a sheet material such as chlorinated rubber, known commercially as "Pliofilm," which is light, flexible, transparent and free from porosity, as well as being sealable by heat and pressure. Other suitable transparent or opaque flexible, impervious materials can be used, of which one is known commercially as "Diaphane," a heat-sealing paper product, comprising glassine, or, preferably, vegetable parchment rendered impervious by a flexible impregnating coating comprising a wax and/or a resin and a plasticizer. Other suitable flexible, impervious sheet materials may be of several general types such as organic esters of cellulose or cellulose ethers, rendered impervious, if necessary because of their hygroscopic tendencies, by a suitable flexible coating comprising a wax and/or a resin or a coating composition having latex as a basic ingredient, polyvinyl films, such as the vinyl chloride films known commercially as "Koroseal" or "Vinylite," or polyamide films, such as the film known commercially as nylon. If the flexible, impervious sheet material is comprised of a base sheet, such as paper, vegetable parchment, glassine, regenerated cellulosic sheeting, or the like, rendered impervious by a flexible, impervious impregnating coating comprising a wax and/or a resin, such as a polyvinyl resin, for example, and a plasticizer, or a coating composition having latex as a basic ingredient, the coating may be applied to one or both sides of the base sheet. If the base sheet is coated on only one side, the inner container 10 is preferably fashioned so that the coated surface of the base sheet becomes the inner surface of the inner container.

The open mouth of the filler inner container 10 is then hermetically sealed by pressure at a temperature of approximately 300° Fahrenheit, preferably with a suitable heat sealing device. Thus the adjacent surfaces of the sealed mouth of the inner container are united by a weld resulting from the heat and pressure of the sealing operation. A single inner container is placed in an outer cooking container 11 (Figure 3) which can be of metal or oven glass. In quantity operation, a number of the inner containers are placed in either the multiple type outer cooking container 12 or 13, as shown in Figures 5 and 6, respectively.

The cooking container 11 is in the form of a cup 11a having a cover 11b which can be secured thereto by suitable clamps 11c and sealed water and air tight by a gasket 11d. The multiple container 12 is constructed of a number of cups 12a connected at their upper open ends by a flange 12b so as to be rigidly supported and spaced from each other to permit the free circulation of cooking liquid or vapour therebetween. A cover 12c is adapted to be secured to the flange 12b by suitable clamps 12d, and a gasket 12e is provided to enable the cups to be sealed air and water tight.

The other type of multiple cooking container 13 is in the form of a relatively deep cup 13a in which several of the inner containers 10 are adapted to be placed in a stack, and to be sealed therein air and water tight by a screw-threaded cover 13b and a gasket 13c.

When the inner container 10 is made of "Pliofilm" or similar material which, when heated, tends to adhere to the cooking container, paper liners 14 (Figures 3, 5 and 6) are interposed between the several inner containers, and a paper separator 15 (Figure 6) is interposed between the inner containers 10 and the walls of the multiple cooking container 13. The liners 14 and 15 are not necessary when the inner containers are each placed in non-adherent carrier containers before being placed in the cooking vessel or when the inner container 10 is made of flexible, impervious sheet material which is non-adherent to walls of the cooking container.

It is to be particularly noted that the internal dimensions of the outer cooking containers are only large enough to receive freely the filled and sealed inner containers 10. In practice a clearance of ⅛" to ¼" in length, width and depth has been found suitable. The inner containers, which are not self supporting and are so flexible that they stretch and ultimately burst when subjected to cooking heat and the resulting internal pressure, are thus confined to a limited amount of expansion in any direction. The restricted expansion permitted by the closed cooking containers is not sufficient to rupture or weaken the inner containers.

After being sealed air and water tight by its cover and gasket, the cooking container 11, 12 or 13 is placed in a boiler or retort, such as is now used for the processing of cans and jars, and is subjected to a cooking temperature until the product is thoroughly cooked, following which the container is cooled quickly in cold circulating water. The cooking container is then unsealed and the inner containers removed and placed in structurally strong carrier containers 16 constructed of any suitable rigid cardboard or chip board.

When using the cold pack method, the product is prepared as described above and placed in the inner containers 10 in a cold or raw state, with the necessary amount of water and/or seasoning added, as the product may require. The filled and sealed containers 10 are then placed in the cooking container 11, 12, or 13. The cooking container is sealed air and water tight and placed in a suitable boiler or retort for cooking until the food product is thoroughly cooked and sterilized. The cooking container is then quickly cooled and opened and the sealed inner containers 10 are removed and placed in the structurally strong carrier containers 16, after which the complete packages are ready for the shipping receptacle.

Products that require cooking in a partial vacuum, commercially known as dry pack, are placed in the inner containers 10 and the required vacuum drawn, following which the inner containers are hermetically sealed. The filled and sealed inner containers are placed in the cooking containers, 11, 12, or 13. The cooking containers are then placed in a retort, pressure cooker or boiler, and allowed to remain until the product is sufficiently cooked, following which the cooking containers are cooled. The inner containers are then removed from the cooking containers and placed in outer carrier containers 16.

The metal or oven glass cooking containers can be steam-jacketed for the cooking operation by live steam. An important feature of the process is the dimensional relationship of the cooking containers to the inner containers 10 which permits the product hermetically sealed in the inner containers to be cooked without rupturing the relatively fragile and flexible inner containers, without destroying their flexibility, and often actually increasing their tensile strength. Since the cooking container limits the inner container to a very slight expansion, maximum vapor pressures for the cooking temperature are set up within the inner container. This aids in processing and sterilizing the product.

It should be apparent from the foregoing that in performing the process described herein that the inner containers 10 may be made of any suitable flexible, impervious materials and may be placed in the carrier containers 16 either before the inner containers 10 are processed in the cooking containers 11, 12, or 13 or after the inner containers have been so processed, regardless of whether the food product is packed by either the open kettle, cold pack, or dry pack methods. It should be apparent also that the carrier containers may be provided with suitable windows when the inner container 10 is of transparent material. Also a suitable overwrap of "Cellophane" or like wrapping material may be applied to the carrier container 16 when it seems desirable.

The process described above produces a product which is ideal for heating and serving in the home. It is only necessary to place the inner containers in a vessel of boiling water and permit them to remain for a few minutes, after which the heat may be cut off from the vessel and the vessel covered. In about ten minutes the hermetically sealed products in the inner containers are thoroughly heated and ready to serve by opening the containers and placing the contents in serving dishes.

The process embodied in this invention produces a product which entirely eliminates the use of can openers and other devices, which, in many instances, deposit metal particles from the can into its contents during the opening operation, with the attendant danger of causing serious injury if such particles of metal are eaten with the food.

Foods preserved by this process will retain a more natural flavor with the correct amount of natural juices and apparently retain their vitamin content as well as all other beneficial properties of fresh foods.

From the foregoing, it is apparent that this process is not limited to the particular embodiments disclosed but may be modified, either in whole or in part, within the scope of the appended claims to meet the requirements of the particular food products which are to be preserved and the characteristics of the particular materials of which the inner container may be made.

What is claimed is:

1. The process of preserving food products which comprises the steps of placing the food product in an inner container composed of a flexible base sheet coated with a flexible, impervious coating; hermetically sealing the food product in the inner container; placing the filled and sealed inner container in a cooking container, the internal walls of which will confine the inner container against rupture due to expansion of the inner container caused by cooking the contents of said sealed inner container; sealing the cooking container air and water tight; and subjecting the cooking container to temperatures sufficient to cook the food product within the inner container.

2. The process of preserving food products which comprises the steps of placing the food product in an inner container composed of a flexible base sheet coated with a flexible, impervious coating; hermetically sealing the food product in the inner container; placing the filled and sealed inner container in a cooking container, the internal walls of which will confine the inner container against rupture due to expansion of the inner container caused by cooking the contents of said sealed inner container; sealing the cooking container air and water tight; subjecting the cooking container to temperatures sufficient to cook the food product within the inner container; cooling the cooking container; removing the inner container from the cooking container and then placing the inner container in a carrier container.

3. The process of preserving food products which comprises the steps of placing the food product in an inner container composed of a flexible fibrous base sheet coated with a flexible impervious impregnating coating; hermetically sealing the food product in the inner container; placing the filled and sealed inner container in a cooking container, the internal walls of which will confine the inner container against rupture due to expansion of the inner container caused by cooking the contents of said sealed inner container; sealing the cooking container air and water tight; and subjecting the cooking container to temperatures sufficient to cook the food product within the inner container.

4. The process of preserving food products which comprises the steps of placing the food product in an inner container composed of a flexible paper base sheet coated with a flexible impervious impregnating coating comprised of a resin and a plasticizer; hermetically sealing the food product in the inner container; placing the filled and sealed inner container in a cooking container, the internal walls of which will confine the inner container against rupture due to expansion of the inner container caused by cooking the contents of said sealed inner container; sealing the cooking container air and water tight; subjecting the cooking container to temperatures sufficient to cook the food product within the inner container, cooling the cooking container; removing the inner container from the cooking container and then placing the inner container in a carrier container.

5. The process of preserving food products which comprises the steps of placing the food product in an inner container of cellulosic sheeting coated with a flexible, impervious coating; hermetically sealing the food product in the inner container; placing the filled and sealed inner container in a cooking container, the internal walls of which will confine the inner container against rupture due to expansion of the inner container caused by cooking the contents of said sealed inner container; sealing the cooking container air and water tight; and subjecting the cooking container to temperatures sufficient to cook the food product within the inner container.

DURYEA BENSEL.